US011803608B2

(12) United States Patent
Chang

(10) Patent No.: US 11,803,608 B2
(45) Date of Patent: Oct. 31, 2023

(54) CENTRAL DEVICE AND SYSTEM FOR PROCESSING DATA

(71) Applicant: BIOPRO SCIENTIFIC CO., LTD., Hsinchu (TW)

(72) Inventor: Pin Chang, Hsinchu (TW)

(73) Assignees: BIOPRO SCIENTIFIC CO., LTD., Hsinchu (TW); WISETOP TECHNOLOGY CO., LTD., Hsinchu (TW)

(*) Notice: Subject to any disclaimer, the term of this patent is extended or adjusted under 35 U.S.C. 154(b) by 38 days.

(21) Appl. No.: 16/884,857

(22) Filed: May 27, 2020

(65) Prior Publication Data
US 2020/0380052 A1 Dec. 3, 2020

Related U.S. Application Data

(60) Provisional application No. 62/854,125, filed on May 29, 2019.

(51) Int. Cl.
G06F 15/16 (2006.01)
G06F 16/958 (2019.01)
H04W 4/80 (2018.01)
G06F 3/0488 (2022.01)
H04L 67/02 (2022.01)

(52) U.S. Cl.
CPC .......... G06F 16/958 (2019.01); G06F 3/0488 (2013.01); H04L 67/02 (2013.01); H04W 4/80 (2018.02)

(58) Field of Classification Search
CPC .......... G01S 19/04; G01S 19/05; G01S 19/06; G01S 19/07; G01S 19/43; G06F 16/958; G06F 17/40; G06F 3/0488; H04L 67/02; H04W 4/80
See application file for complete search history.

(56) References Cited

U.S. PATENT DOCUMENTS

| 7,908,315 B2* | 3/2011 | Parkinson | G06F 8/61 709/224 |
| 8,862,393 B2* | 10/2014 | Zhou | G08C 17/02 340/506 |
| 9,208,293 B1* | 12/2015 | Zhu | H04W 4/029 |
| 9,419,689 B2* | 8/2016 | Park | H04M 1/72412 |
| 9,712,736 B2* | 7/2017 | Kearns | H04N 5/76 |
| 10,145,827 B2* | 12/2018 | Risk | G01N 33/0008 |
| 10,609,114 B1* | 3/2020 | Bicket | G06F 3/048 |

(Continued)

OTHER PUBLICATIONS

Extended Search Report dated Oct. 14, 2020 issued by the European Patent Office for counterpart application No. 20176730.8.

Primary Examiner — Ario Etienne
Assistant Examiner — Thorne E Waugh
(74) Attorney, Agent, or Firm — WPAT, P.C., INTELLECTUAL PROPERTY ATTORNEYS; Anthony King

(57) ABSTRACT

A system for processing data is provided. The system includes a data acquisition device and a central device. The data acquisition device is coupled to an object under test for receiving raw data from the object under test, and transmits the raw data. The central device receives the raw data from the data acquisition device, and performs a web application with a web interface for providing application data based on the raw data.

18 Claims, 13 Drawing Sheets

(56) References Cited

U.S. PATENT DOCUMENTS

| | | | |
|---|---|---|---|
| 2004/0205556 A1* | 10/2004 | Abramovitch | G06F 16/958 707/E17.116 |
| 2004/0227523 A1* | 11/2004 | Namaky | H04L 67/04 324/537 |
| 2006/0116842 A1* | 6/2006 | Tarantola | G01D 21/00 702/122 |
| 2007/0093990 A1* | 4/2007 | Tarantola | G01D 21/00 702/186 |
| 2008/0146960 A1* | 6/2008 | Irazoqui-Pastor | G06N 3/061 455/116 |
| 2015/0268282 A1* | 9/2015 | Ahmadi | G06Q 50/04 702/62 |
| 2016/0148446 A1* | 5/2016 | Corriere | G07C 5/0816 701/29.1 |
| 2018/0029184 A1* | 2/2018 | Greenwald | B23Q 17/008 |
| 2018/0120384 A1* | 5/2018 | Kallfelz | G01R 31/371 |
| 2019/0128925 A1* | 5/2019 | Barthel | G01R 13/029 |
| 2020/0030608 A1* | 1/2020 | Halpern | A61N 1/36139 |
| 2020/0264141 A1* | 8/2020 | Denny | G01N 30/8617 |
| 2020/0390360 A1* | 12/2020 | Li | G06F 3/14 |
| 2021/0138249 A1* | 5/2021 | Howard | A61N 1/36082 |
| 2021/0338973 A1* | 11/2021 | Poltorak | G06V 10/764 |

\* cited by examiner

CENTRAL DEVICE AND SYSTEM FOR PROCESSING DATA

CROSS REFERENCE TO RELATED APPLICATIONS

This application claims the benefit of prior-filed provisional application No. 62/854,125, filed on May 29, 2019, which is incorporated by reference in its entirety.

TECHNICAL FIELD

The present disclosure generally relates to a central device and a system for processing data, more particularly, to a central device-based system for automatically processing data.

BACKGROUND

Regarding a conventional data processing procedure, a hardware (e.g., a benchtop instrument), which has a data sensing component, a data calculation part, and a user interface part, is provided. In the general case, the data sensing component, the data calculation part, and the user interface part are all integrated within one container, for example, within an instrumentation chassis. However, the conventional data processing procedure and the hardware thereof are inefficient and inflexible.

SUMMARY

One aspect of the present disclosure provides a system for processing data. The system includes a data acquisition device and a central device. The data acquisition device is for acquiring raw data from an object under test and includes a data interface and a first transceiver. The data interface is coupled to the object under test for receiving the raw data from the object under test. The first transceiver is electrically coupled to the data interface. The central device includes a storage, a second transceiver, a first processing unit, and a third transceiver. The second transceiver is for receiving the raw data from the first transceiver of the data acquisition device. The first processing unit is electrically coupled to the storage and the second transceiver. The first processing unit is used for storing the raw data in the storage, and performing a web application with a web interface to provide application data based on the raw data. The third transceiver is electrically coupled to the first processing unit.

One aspect of the present disclosure provides a central device for processing data. The central device includes a storage, a first transceiver, a second transceiver, and a processing unit. The first transceiver is for receiving raw data from a data acquisition device. The processing unit is electrically coupled to the storage and the first transceiver. The processing unit is used for storing the raw data in the storage, and performing a web application with a web interface to provide application data based on the raw data. The second transceiver is electrically coupled to the processing unit.

One aspect of the present disclosure provides an experimental system. The experimental system includes a plurality of sensing units and a hub. The sensing units are for sensing signals from a plurality of objects. The hub is for wirelessly communicating with the sensing units, generating application data based on the sensed signals, and performing a web application with a web interface for providing the application data. The application data is provided through a network to at least one user device.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A complete understanding of the present disclosure may be derived by referring to the detailed description and claims when considered in connection with the Figures, where like reference numbers refer to similar elements throughout the Figures.

DETAILED DESCRIPTION

Figure 1A:
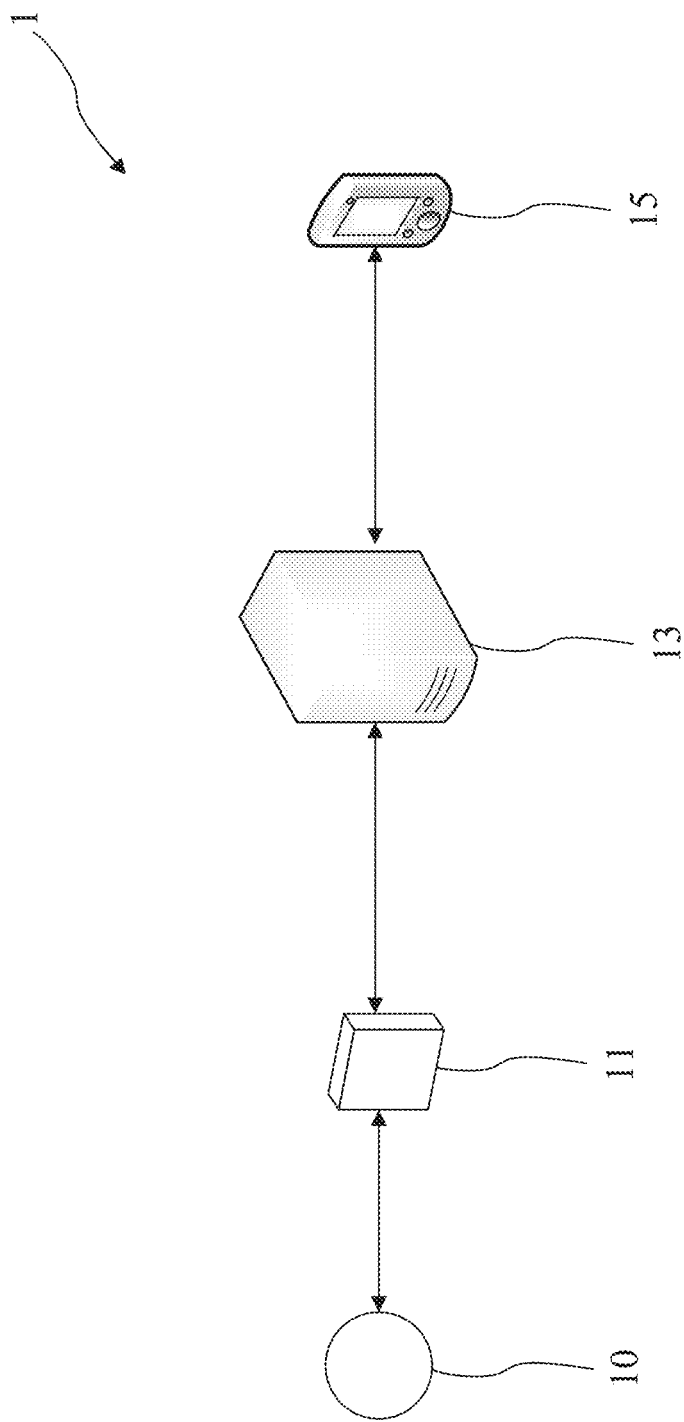
FIG. 1A is a schematic view of a system for processing data in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

Regarding a conventional data processing procedure, a hardware (e.g., a benchtop instrument), which has a data sensing component, a data calculation part, and a user interface part, is provided. In the general case, the data sensing component, the data calculation part, and the user interface part are all integrated within one container, for example, within an instrumentation chassis. The data sensing component is used for sensing an object for obtaining data. The sensed data is input to the data calculation part for necessary adjustments and/or transformations before being displayed on the user interface part.

In some cases, in particular to high-end products, the hardware further has a data transmission port, such as a parallel port (e.g., IEEE488), a serial port (e.g., UART, RS232, RS485), and/or a USB port. The data can be provided to the user equipment through the data transmission port. Accordingly, after connecting to the hardware via the data transmission port, the user equipment can obtain the sensed data from the hardware and/or execute a designated software thereon for processing the sensed data.

However, there are at least following defects of the mentioned hardware used for the conventional data acquiring procedure: (1) integrating all the elements within one box reduces the flexibility of the data acquiring procedure; (2) for the cases hardware having the data transmission port, the user equipment needs to stay connected to the hardware during the entire process; (3) for the cases hardware having the data transmission port, a display of the user equipment can replace the user interface part and makes the user interface part redundant; and (4) for the cases hardware having the data transmission port, the number of available data transmission ports limits the maximum number of pieces of the user equipment allowed to connect to the hardware.

To improve the defects of the hardware of the conventional data acquisition procedure, the present disclosure generally provides a central device and a system for processing data. More particularly, a central device-based system which at least plays the role of a data server and the role of a Web-based UI (user interface) server. By the role of a data server, the central device-based system is able to receive data from an external data sensing component and store the said received data. By the role of a Web-based UI server, the central device-based system is able to provide data to user devices. Further details will be described in the following paragraphs.

Figure 1B:
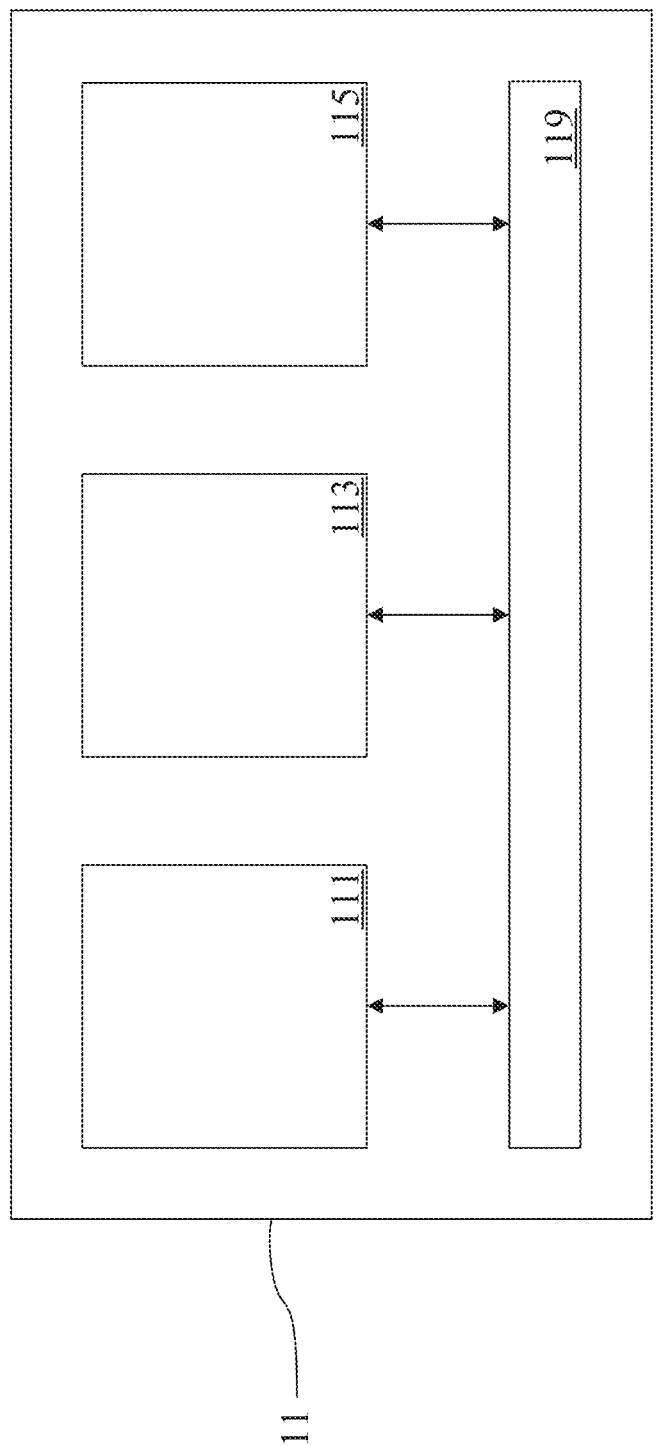
FIG. 1B is a block diagram of a data acquisition device in accordance with various embodiments of the present disclosure.
Figure 1C:
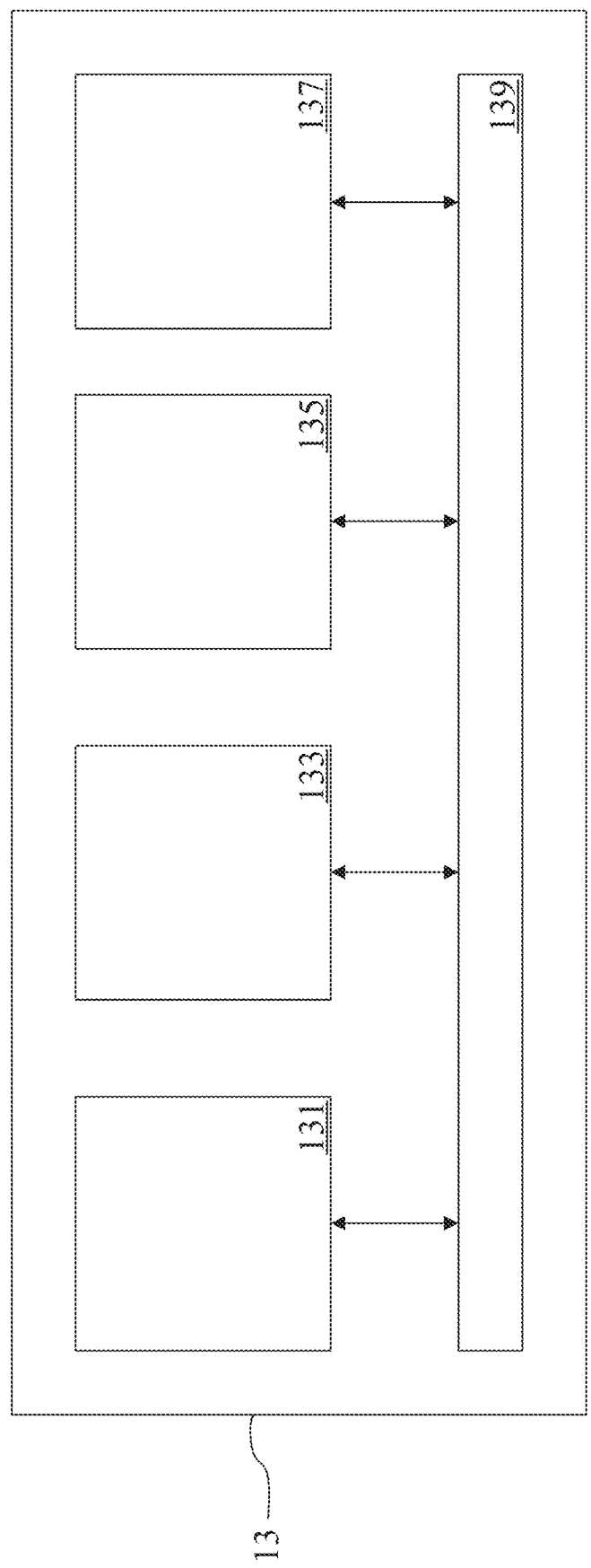
FIG. 1C is a block diagram of a central device in accordance with various embodiments of the present disclosure.
Figure 1D:
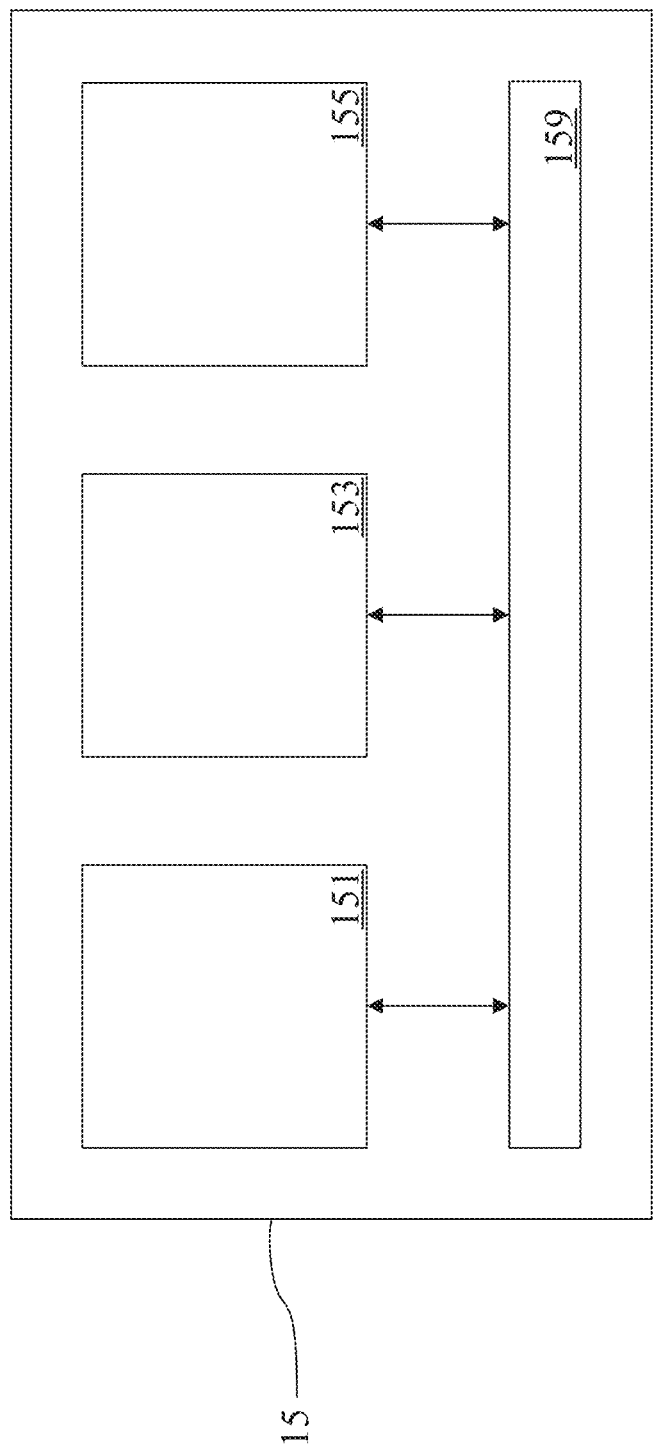
FIG. 1D is a block diagram of a user device in accordance with various embodiments of the present disclosure.

FIG. 1A is a schematic view of a system 1 for processing data. The system 1 may include a data acquisition device 11, a central device 13, and a user device 15. FIGS. 1B to 1D are block diagrams of the data acquisition device 11, the central device 13, and the user device 15.

In some embodiments, the data acquisition device 11 may include a data interface 111, a controller 113, and a first transceiver 115. The data interface 111, the controller 113, and the first transceiver 115 may be electrically coupled (e.g., electrically coupled via bus 119).

In some embodiments, the central device 13 may include a second transceiver 131, a storage 133, a first processing unit 135, and a third transceiver 137. The second transceiver 131, the storage 133, the first processing unit 135, and the third transceiver 137 may be electrically coupled (e.g., electrically coupled via bus 139).

In some embodiments, the user device 15 may include a fourth transceiver 151, a second processing unit 153, and an input/output (IO) unit 155. The fourth transceiver 151, the second processing unit 153, and the I/O unit 155 may be electrically coupled (e.g., electrically coupled via bus 159). The interactions between the individual elements may include serial or parallel buses and will be further described hereinafter.

Figure 2A:
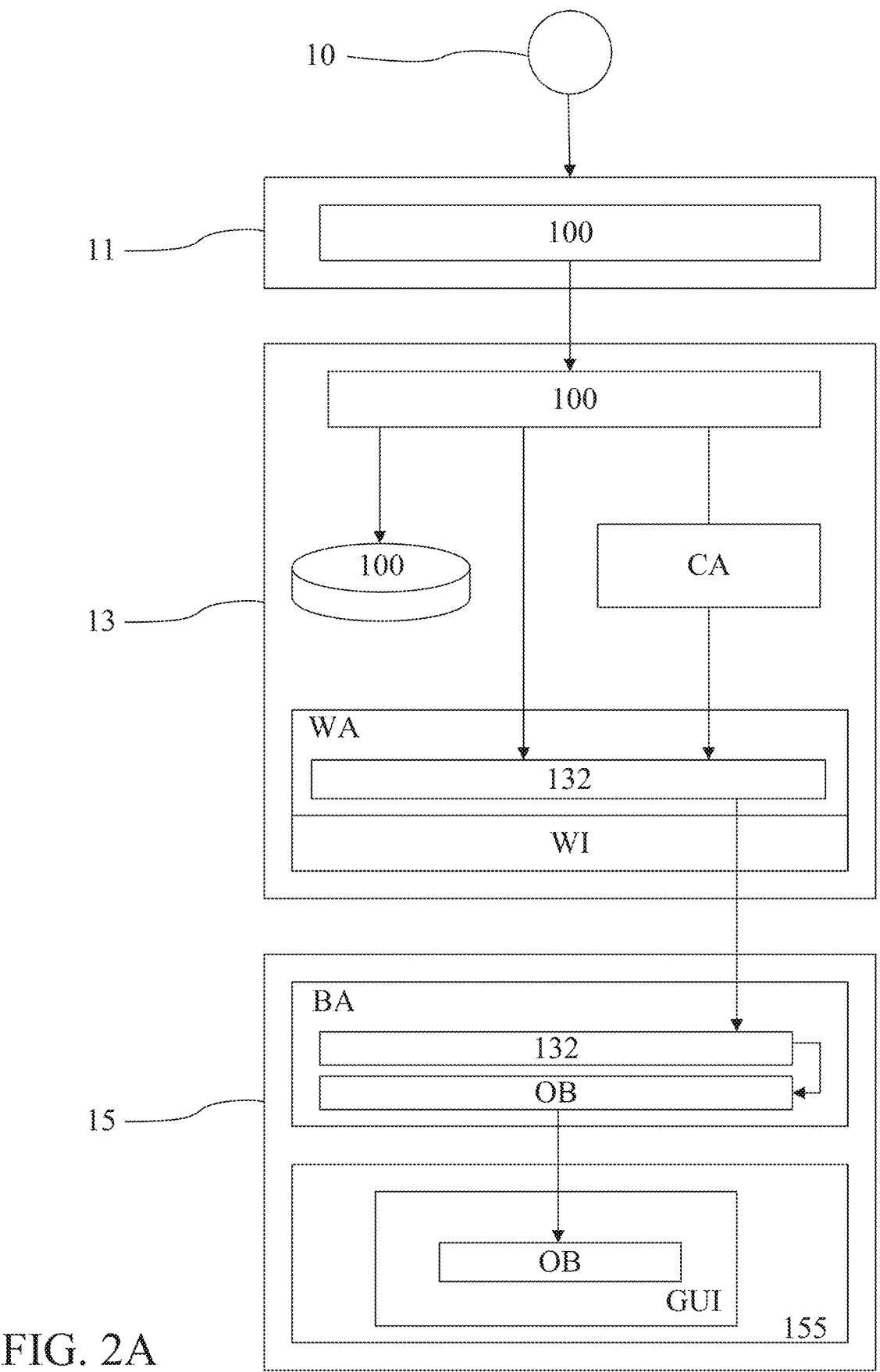
FIG. 2A is a schematic view of processing data in accordance with various embodiments of the present disclosure.

Please refer to FIG. 2A. FIG. 2A is a schematic view of processing data. In some embodiments, the data interface 111 of the data acquisition device 11 may be coupled with an object under test 10 for receiving input signals from the object under test 10 and generating a raw data 100 according to the input signals. The controller 113 may control the first transceiver 115 to transmit the raw data 100 to the central device 13.

In some implementations, the data interface 111 may include a transducer, and the input signals may be obtained at least through the transducer. For example, the transducer transduces a physical quantity obtained from the object under test 10 to an electrical signal.

In some implementations, the transducer may be placed neighboring to the object under test 10. For example, the transducer includes an electrode (wire, probe, conductive pad, etc.). The transducer transduces the electromagnetic condition around the electrode into an electrical voltage and current signal in the conductor which connects to the electrode. For another example, the transducer includes a thermistor placed in a tissue neighboring to the object under test 10 to monitor its temperature. For still another example, the transducer includes a capacitive pressure sensor placed neighboring to the object under test 10 (e.g., inside an organ of the object under test 10 to monitor its internal pressure).

In some implementations, the data interface 111 may further include a front end analog electronics to receive the output of the transducer by resistance/capacitance measurements. In some implementations, the data interface 111 may further include an amplifier and an analog to digital converter (ADC) to convert the output of the front end analog electronics to a digital signal. In some implementations, the converted digital signal may be regarded as the raw data 100.

In some embodiments, the second transceiver 131 of the central device 13 may receive the raw data 100 from the first transceiver 115 of the data acquisition device 11. In some implementations, the first transceiver 115 of the data acquisition device 11 and the second transceiver 131 of the central device 13 may communicate with each other based on a lower power consumption network protocol (e.g., Bluetooth Low Energy protocol) for purpose of saving power.

After collecting data (i.e., the raw data 100) from the data acquisition device 11, for the purpose of providing data to different user's platforms, techniques of web service may be introduced. In particular, the first processing unit 135 may perform a web application WA with a web interface WI and provide application data 132. The application data 132 is provided according to the raw data 100 via the web application WA with the web interface WI.

More specifically, in some embodiments, the first processing unit 135 of the central device 13 may utilize the raw data 100 as the application data 132. Then, the first processing unit 135 may transmit the application data 132 to the user device 15 through the third transceiver 137. The transmission of the application 132 may be in response to a request from the user device 15 to the web application WA. For example, request for real-time display, review of previous data, and downloading data sets to the user device 15. The first processing unit 135 may also receive data uploaded from the user device 15 through the third transceiver 137. In some implementations but not a limitation of the present disclosure, the first processing unit 135 may temporarily store the raw data 100 in the storage 133 for later use.

In some embodiments, the processing unit 135 of the central device 13 may further execute a data calculation application CA for converting the raw data 100 into the application data 132. The data calculation application CA may be install in the storage 133. Then, the processing unit 135 of the central device 13 may transmit the application data 132 to the user device 15 through the third transceiver 137.

For example, the data calculation application CA may be some specific experimental software, and the application data 132 may be the processed data generated by the experimental software. In some implementations but not a limitation of the present disclosure, the data calculation application CA may be installed in a cloud server external from the central device 13 and performed by the cloud server. In these embodiments, the raw data 100 may be transmitted to the cloud server for the calculation application CA to calculate, and the calculated data may be transmitted back to the central device 13 for later use.

To put it more specifically, the data processing procedures performed by the data calculation application CA may include data extraction (feature extraction, trend-fitting, statistical reduction), data correlation (within or between datasets), data transformation (e.g., Fourier transform, Hilbert-Huang transform, wavelet transform), and so on.

In some embodiments, the user may use the user device 15 to retrieve the application data 132. In particular, based on the users operation, the second processing unit 153 of the user device 15 may perform a browsing application BA for interfacing with the web interface WI of the web application WA of the central device 13.

Then, based on the user's demand, the user device 15 may request the application data 132, which may include the raw data 100 and/or the data converted by the calculation application CA, from the central device 13. Accordingly, the third transceiver 137 of the central device 13 may transmit the application data 132 to the user device 15 through a network according to the request. Subsequently, the fourth transceiver 151 of the user device 15 may receive the application data 132 from the central device 13.

In some implementations, the third transceiver 137 of the central device 13 and the fourth transceiver 151 of the user device 15 may communicate with each other based on a well-developed network protocol (e.g., Wi-Fi network protocol) for web service.

Afterward, the second processing unit 153 of the user device 15 may perform the browsing application BA to transfer the application data 132 into a data object OB. The I/O unit 155 of the user device 15 may output the data object OB via a graphic user interface GUI of the browsing application BA. The I/O unit 155 of the user device 15 may further receive a control signal to perform an output operation in the data object OB.

More specifically, in some embodiments, the I/O unit 155 may include a touch screen, and the data object OB may be presented on the touch screen via the graphic user interface GUI of the browsing application BA. The user may touch the touch screen for operating the data object OB.

Figure 2B:
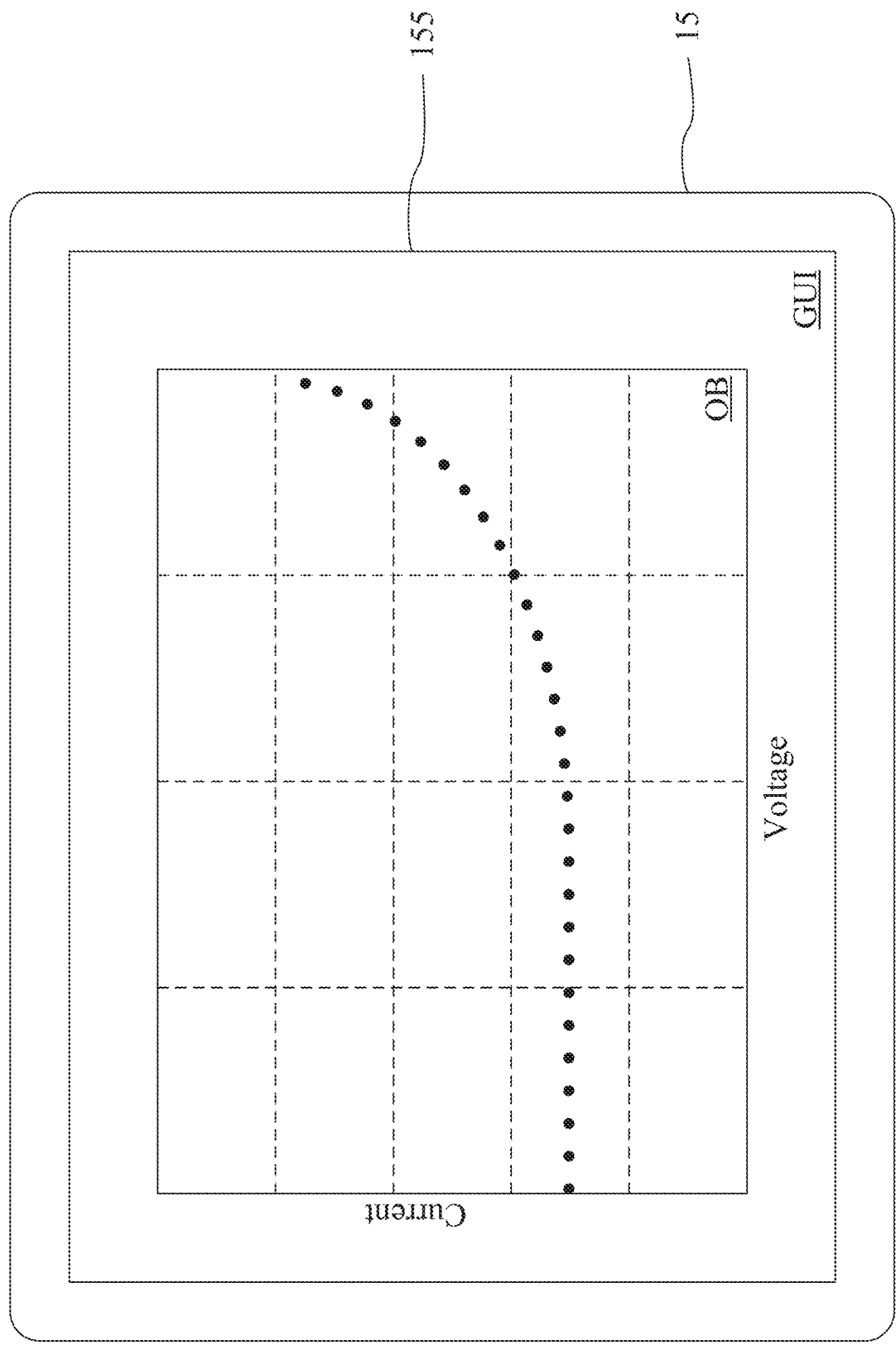
FIG. 2B is a schematic view of outputting and operating a data object in accordance with various embodiments of the present disclosure.

For example, please refer to FIG. 2B together with FIG. 2A. FIG. 2B is a schematic view of outputting and operating the data object OB. In detail, the application data 132 may include data of current and voltage, and the data object OB transferred from the application data 132 may be presented as IV-curve on the touch screen via the graphic user interface GUI.

The user may apply different types of gestures onto the touch screen based on what the user sees rendered through the graphic user interface GUI. In this way, various control signals may be generated from the gestures via the touch screen. Accordingly, at least a portion of the data object OB may be displayed on the touch screen according to the control signals (e.g., the data object OB may be zoom-in for details or zoom-out for a bigger picture according to the control signals).

In some embodiments, the application data 132 may include a plurality of data and a plurality of timestamps. The plurality of timestamps corresponds to the plurality of data. The data object OB may be obtained based on at least a portion of the application data 132.

In particular, the user only needs the data during a specific time interval. Accordingly, the data object OB may contain some data, which are with some timestamps during that specific time interval, of the application data 132. Therefore, the bandwidth requirement for transmitting data may be reduced.

It should be noted that, when the application data 132 includes the raw data 100, the raw data 100 may include a plurality of data and corresponding timestamps. Similarly, when the application data 132 includes the data converted by the calculation application CA, the converted data may include a plurality of data and corresponding timestamps.

In some embodiments, because the application data 132 may be provided by the central device 13 via the technique of web service, connections with multi-user devices (e.g., the user device 15) may be inherently supported, and each user device may individually utilize the application data 132.

In some embodiments, the central device 13 may be free from having a display for displaying the application data 132 because the application data 132 may be displayed on user device 15. For example, some user devices (e.g., smartphones, tablets, notebook PCs, desktop computers, and central servers with consoles/terminals connected to them)

may be equipped with adequate displays for displaying the data provided by the central device 13.

In addition, in some embodiments, the central device 13 may be free from having a control panel (e.g., the control panel with buttons/knobs for setting the central device 13) because the configurations of the central device 13 and the data calculation application CA of the central device 13 may be set by the user device through the technique of web interface.

For example, some user devices may be equipped with adequate control means (i.e., input means, e.g., push-button keys, keyboard, keypad, mouse, touch screen, trackball, joy-stick, voice command, gesture control, facial recognition, brain-computer interface, etc.) for detecting the user's controlling operation. The user's controlling operation may be used for setting the configuration of the central device 13 and the data application of the central device 13 through the network.

Figure 2C:
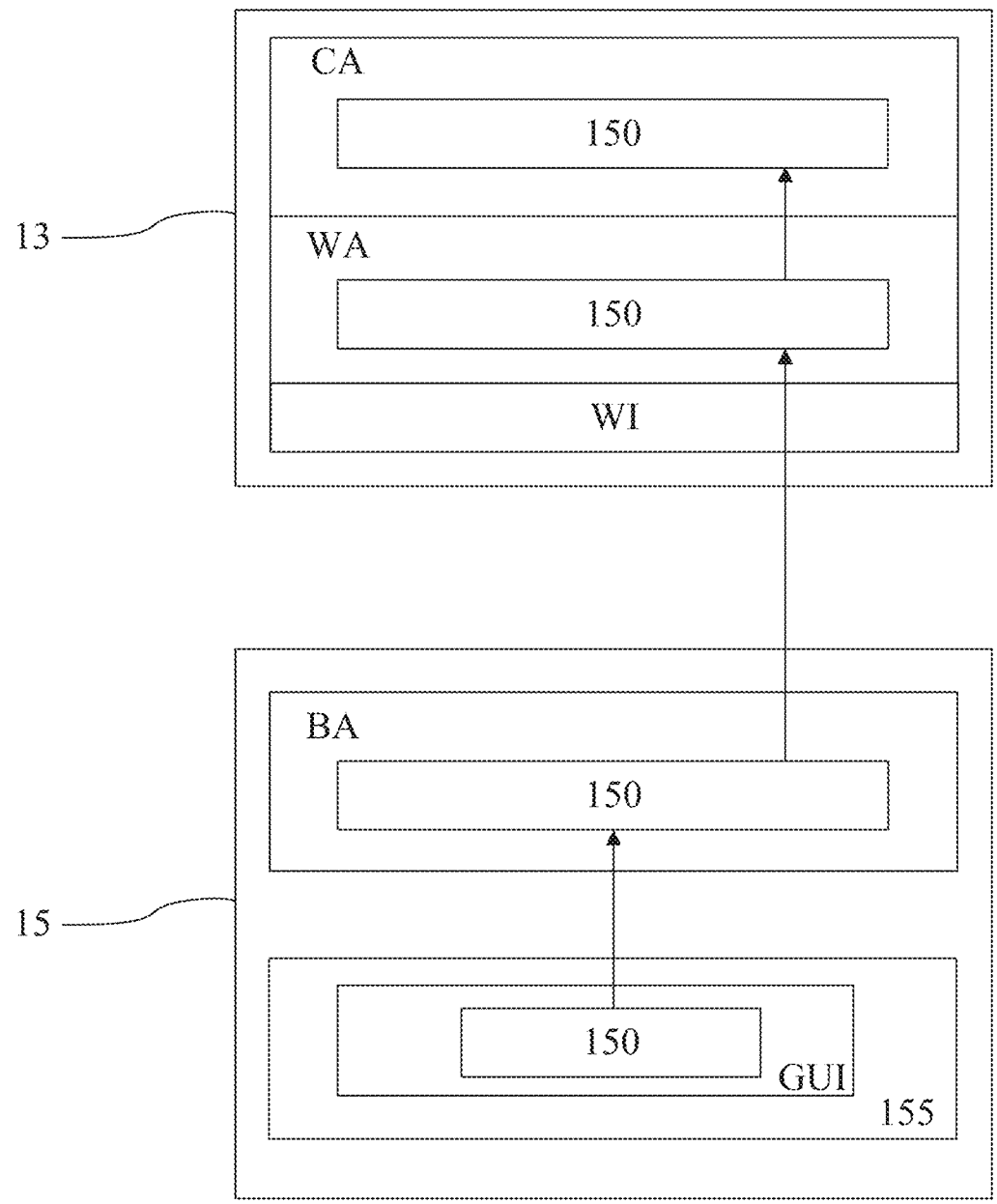
FIG. 2C is a schematic view of instructing a data calculation application in accordance with various embodiments of the present disclosure.

Please refer to FIG. 2C. FIG. 2C is a schematic view of instructing the data calculation application CA. In some embodiments, the user may instruct the data calculation application CA by the user device 15.

In particular, the web application WA of the central device 13 may provide instructions of the data calculation application CA via the web interface WI. The browsing application BA interfacing with the web interface WI may obtain the instructions of the data calculation application CA. The I/O unit 155 of the user device 15 may output the instructions via the graphic user interface GUI of the browsing application BA. Accordingly, the user may set up the data calculation application CA based on the provided instructions.

More specifically, when the user selects one of the instructions of the data calculation application CA via the graphic user interface GUI of the browsing application BA (which interfaces with the web interface WI of the web application WA), the second processing unit 153 of the user device 15 may transmit an instruction 150 via the fourth transceiver 151 to the third transceiver 137 of the central device 13. The instruction 150 may be used for instructing the first processing unit 135 of the central device 13 to set up the data calculation application CA.

Figure 2D:
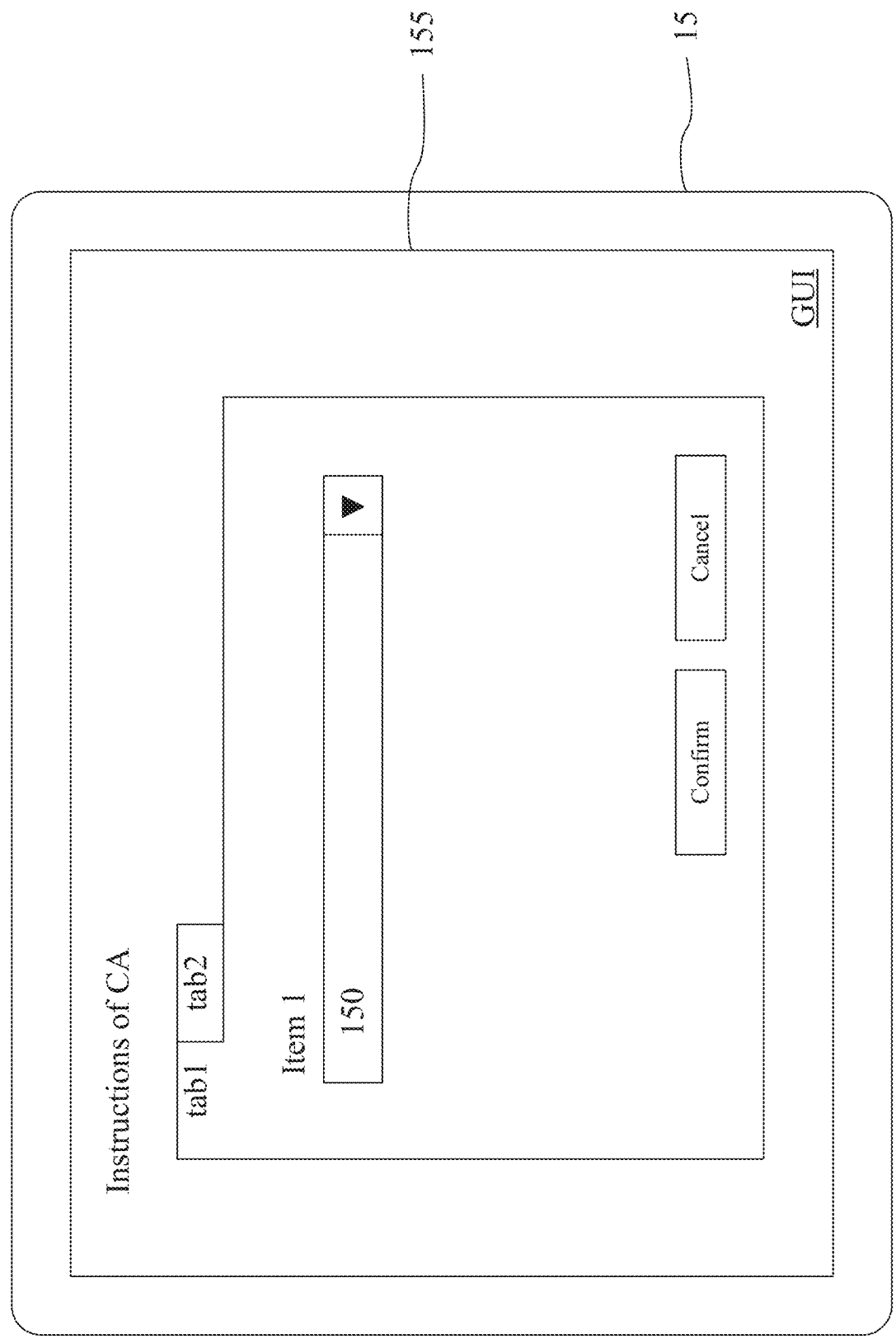
FIG. 2D a schematic view of setting up a data calculation application in accordance with various embodiments of the present disclosure.

For example, please refer to FIG. 2D. FIG. 2D is a schematic view of setting up the data calculation application CA. The instructions of CA may be presented on the I/O unit 155 (e.g., the touch screen) via the graphic user interface GUI of the browsing application BA. The user may click a tab1 for Item 1 of the data calculation application CA. Then the user may click an inverted triangle button of Item 1 for selecting the instruction 150.

After selecting the instruction 150, the user may click the confirm button. Accordingly, the user device 15 may transmit the instruction 150 to the central device 13 for instructing the central device 13 to set up the data calculation application CA according to the instruction 150.

Figure 2E:
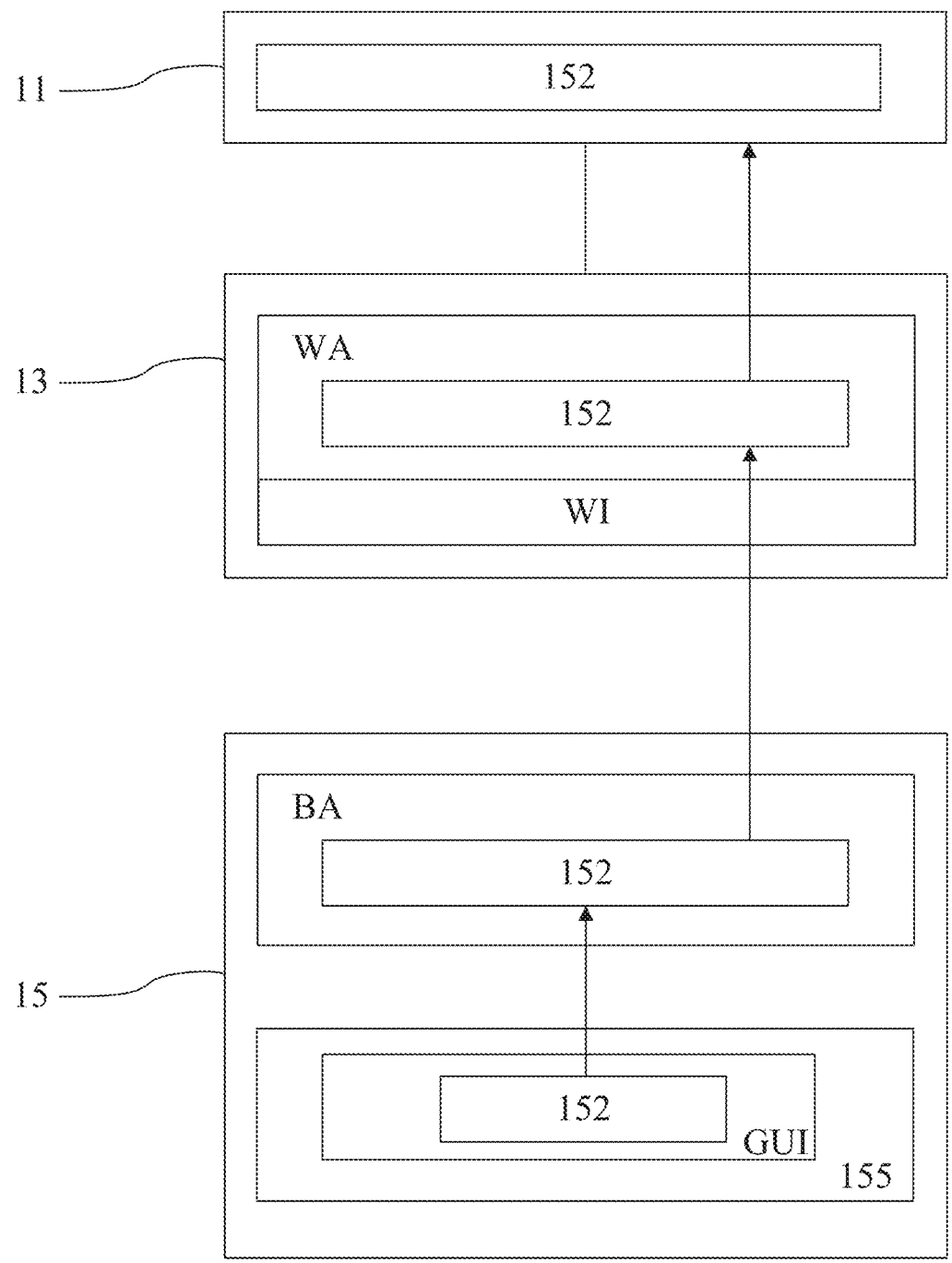
FIG. 2E is a schematic view of configuring a data acquisition device in accordance with various embodiments of the present disclosure.

Please refer to FIG. 2E. FIG. 2E is a schematic view of configuring the data acquisition device 11. In some embodiments, the user may configure the data acquisition device 11 by the user device 15.

In particular, the web application WA may provide some configurations of the data acquisition device 11 for the user to configure the data acquisition device 11. Therefore, when the user selects a device configuration 152 of the data acquisition device 11 via the browsing application BA (which interfaces with the web interface WI of the web application WA), the second processing unit 153 of the user device 15 may transmit the device configuration 152 via the fourth transceiver 151 to the third transceiver 137 of the central device 13.

Subsequently, after the third transceiver 137 of the central device 13 receives the device configuration 152, the first processing unit 135 may control the second transceiver 131 to transmit the device configuration 152 to the data acquisition device 11. The device configuration 152 may be used for configuring at least one setting of the data acquisition device 11.

In other words, after the first transceiver 115 of the data acquisition device 11 receives the device configuration 152, the at least one setting of the data acquisition device 11 may be modified. In some embodiments, the device configuration 152 abovementioned may refer to a specific mode of operation and/or a specific operation for the data acquisition device 11.

Figure 2F:
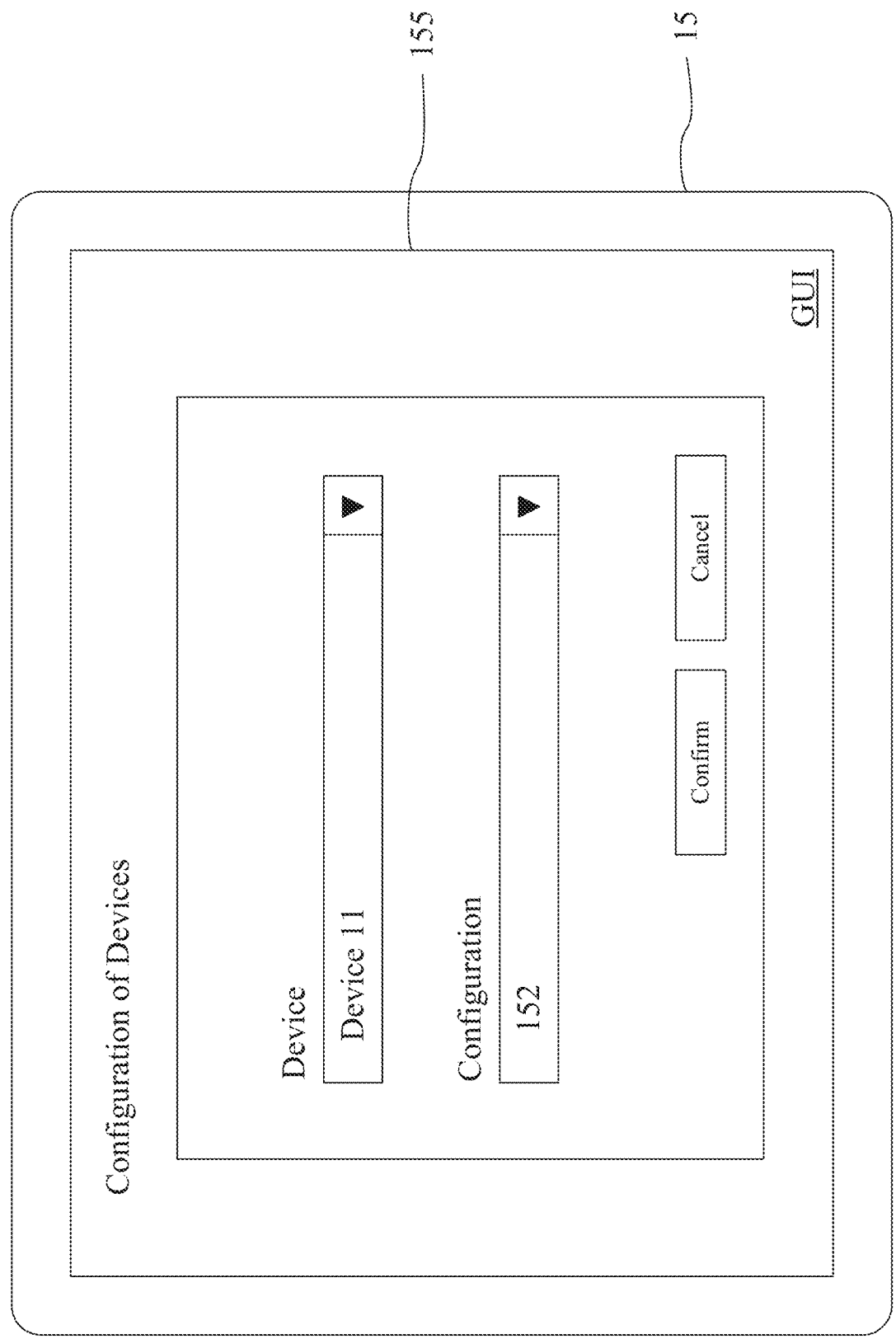
FIG. 2F is a schematic view of configuring a data acquisition device in accordance with various embodiments of the present disclosure.

For example, please refer to FIG. 2F. FIG. 2F is a schematic view of configuring the data acquisition device 11. In detail, the configuration of the device may be presented on the I/O unit 155 (e.g., the touch screen) via the graphic user interface GUI. The user may click an inverted triangle button of the device for selecting the device (e.g., the data acquisition device 11) needed to be configured. Then, the user may click an inverted triangle button of configuration for selecting the device configuration 152.

After selecting the device configuration 152, the user may click the confirm button. Accordingly, the user device 15 may transmit the configuration 152 to the central device 13. Then, the central device 13 may transmit the device configuration 152 to the data acquisition device 11 for configuring the data acquisition device 11.

In some embodiments, the first processing unit 135 of the central device 13 may perform another data calculation application for converting the raw data 100 into another application data. In other words, there may be different data calculation applications running on the central device 13 at the same time for different purposes, which means that the calculation applications do not need to be installed/run on the user device 15.

In some embodiments, the data acquisition device 11 may be free from having non-volatile storage for storing the raw data 100, which means that, after the data interface 111 of the data acquisition device 11 receives raw data 100 from the object under test 10, the controller 113 may control the first transceiver 115 to transmit the raw data 100 to the central device 13 in real-time since there is no non-volatile storage for storing the raw data 100.

In some embodiments, the data acquisition device 11 may include a power unit (e.g., a rechargeable battery) for providing power. Accordingly, the data acquisition device 11 may be portable.

Figure 3A:
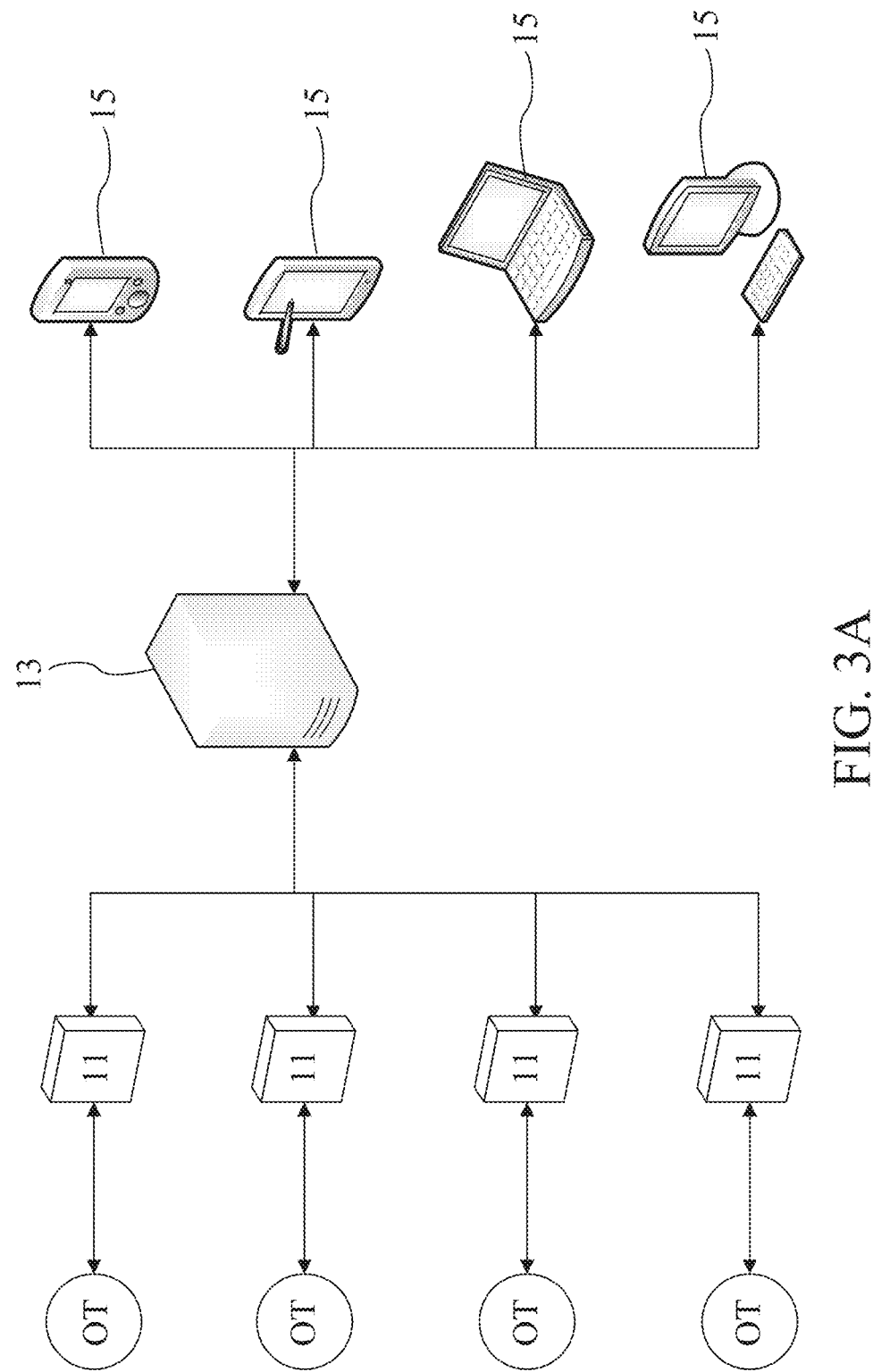
FIG. 3A is a schematic view of a system for processing data in accordance with various embodiments of the present disclosure.

As shown in FIG. 3A, in some embodiments, the system 1 may include a plurality of data acquisition devices 11, the central device 13, and a plurality of user device 15. In these embodiments, the user devices 15 may include smartphones, laptops, tablets, personal computers, etc. which are capable of performing browsing application. Further, each data acquisition device 11 may be coupled with one object under test OT for receiving the raw data, and then transmit the raw data to the central device 13.

In some embodiments, more than one data acquisition device 11 may be coupled to the same one object under test OT. For example, several different data acquisition devices 11 may be disposed of neighboring to different places of the object under test OT to obtain different physical quantities from the object under test OT. The central device 13 may store the raw data directly or perform different data calculation applications for calculating the raw data into different application data for later use.

Next, each user device 15 may retrieve the data corresponding to the data acquisition devices 11 and communicate with different data acquisition devices 11 via the central device 13. More specifically, based on techniques of web service, each user device 15 may perform the browsing application BA to interface with the web application WA of the central device 13, and then obtain different data (i.e., raw data or the calculated data) of different data acquisition devices 11. Further, each user device 15 may configure the data acquisition devices 11 via the central device 13. For example, an access control mechanism may be installed in the central device 13 to manage information flow and/or rights of control between different user devices 15 and different data acquisition devices 11.

Figure 3B:
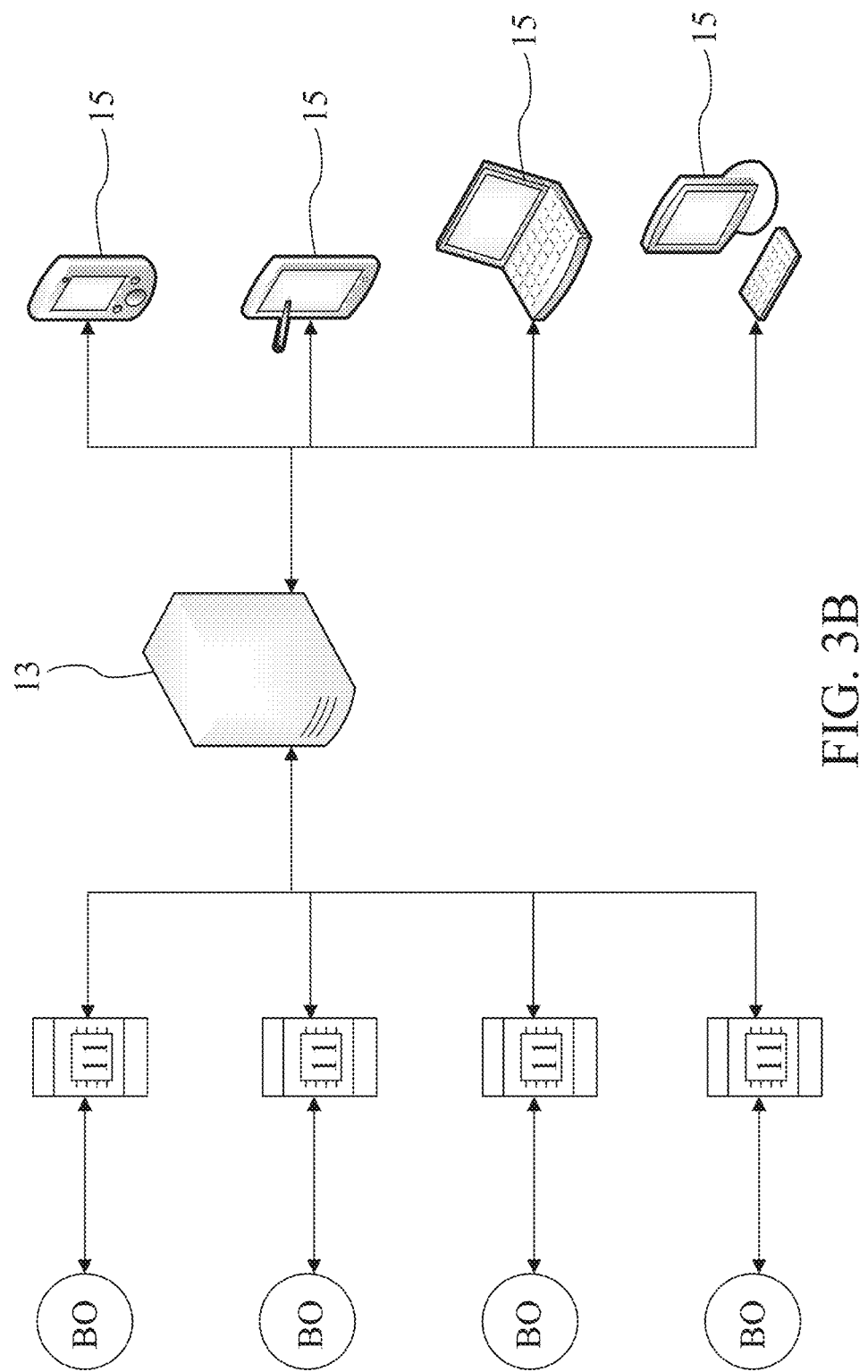
FIG. 3B is a schematic view of a system for processing data in accordance with various embodiments of the present disclosure.

Please refer to FIG. 3B, in some embodiments, each data acquisition device 11 may be a headstage device attached to a biological object (e.g., mouse). The data acquisition device 11 may be used for probing the biological object for sensing analog signals, and the data interface 111 of the data acquisition device 11 may contain an analog-to-digital converter for converting the analog signals to digital numbers.

In some embodiments, some digital numbers may be adjusted in format and/or value (e.g., to reflect the physical value of the measurement, to incorporate calibration information, or to be associated with a timestamp) to become the raw data 100. In other words, the digital numbers directly output from the analog-to-digital converter and/or the adjusted digital numbers may be regarded as the raw data 100.

Further, the central device 13 may be a hub, which has computing capability, and the hub communicates with the headstage devices wirelessly. In some embodiments, the hub may be free from having a monitor/display and may be powered by a rechargeable battery so that the hub can be portable.

The hub performs a plurality of applications for generating application data based on the raw data (e.g., based on the sensed biological signals). Then, the hub may perform a web application with a web interface for providing the application data through a network to the user devices.

On the other hand, each user device may perform a browsing application for interfacing with the web interface of the web application of the hub for obtaining the application data. Further, each user device may perform the browsing application for interfacing with the web interface of the web application to control the headstage devices.

In some embodiments, due to the reason of: (a) data from different data acquisition devices may need to be correlated or combined; (b) operations (e.g., input and output) by different data acquisition devices may need to be coordinate; (c) relative time between different data acquisition devices may need to be known precisely; or (d) absolute time may be less critical, the data acquisition devices 11 may need to be synchronized.

Figure 4:
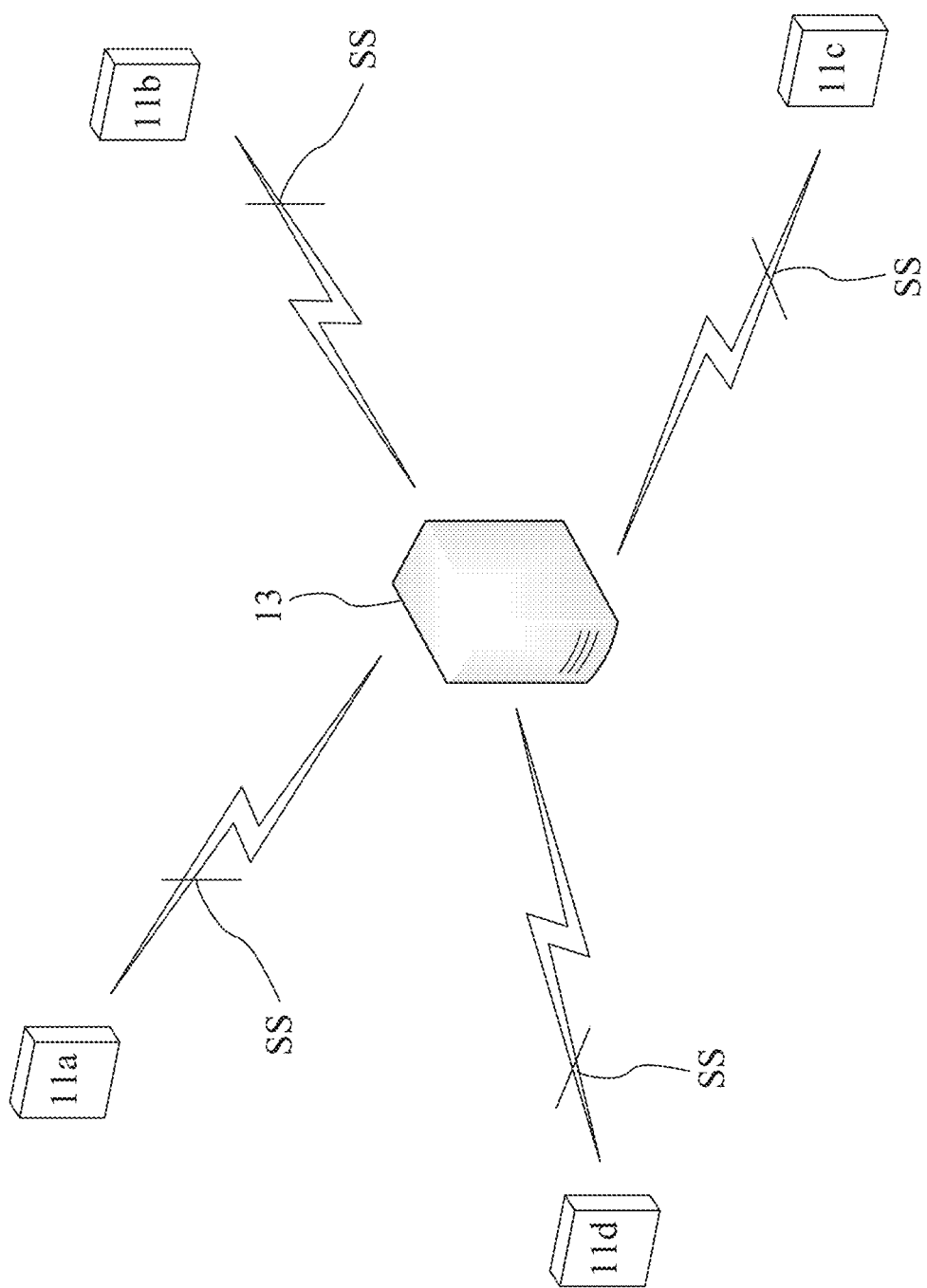
FIG. 4 is a schematic view of synchronization between data acquisition devices in accordance with various embodiments of the present disclosure.

Please refer to FIG. 4, which is a schematic view of synchronization between the data acquisition devices 11. In detail, the first processing unit 135 of the central device 13 may broadcast a synchronization signal SS to the data acquisition devices 11*a* to 11*d* via the second transceiver 131. The synchronization signal SS may include timing information. Subsequently, the controllers 113 of the data acquisition devices 11*a* to 11*d* may receive the synchronization signal SS via the first transceiver 115 and synchronize to the central device 13 according to the synchronization signal SS.

In some embodiments, taking data acquisition device 11*a* for example, when receiving the synchronization signal SS, the controller 113 of the data acquisition devices 11 may determine a time difference 'TD' between a local time 'T-a' of the data acquisition device 11*a* and a global time 'T-r' obtained based on the synchronization signal SS.

Next, the data acquisition device 11*a* may use the time difference 'TD' to calibrate the timestamp of the data, which is to be transmitted to the central device 13. For example, when the data, which is to be transmitted to the central device 13, is generated at a time 'T-A' of the data acquisition device 11*a*, the timestamp of the data may be calibrated by subtracting 'TD' from 'T-A.' Then, the data with the calibrated timestamp may be transmitted to the central device 13.

Similarly, the data acquisition devices 11*b* to 11*d* may synchronize with the central device 13 based on the above steps. Accordingly, the data acquisition devices 11*a* to 11*d* may all be synchronized.

In some embodiments, the data acquisition device 11 may include a tunable oscillator; for example, a voltage controlled oscillator (VCO). The VCO may be tuned to allow the clock of the data acquisition device 11 to be synchronized with the clock of the central device 13. For example, a counter driven by the VCO may be used as a timer for estimating a tuning value of the VCO based on the synchronization signal SS.

In some embodiments, the data acquisition device 11 may include an oven-controlled crystal oscillator (OCXO). The OCXO may be used to drive a counter, and the counter may be used as a timer of the data acquisition device 11. The OCXO may be calibrated based on the time information of the synchronization signal SS for generating some calibration data. The counter driven by the OCXO may be corrected by the calibration data to match the time information of the synchronization signal SS.

It should be noted that the correction of the timer of the data acquisition device 11 may be performed at the data acquisition device 11 or at the central device 13. In particular, the data acquisition device 11 may perform the correction of the timer by the calibration data. Alternatively, the data acquisition device 11 may transmit the timer and the calibration data to the central device 13, and the central device 13 may perform the correction of the timer of the data acquisition device 11 by the calibration data.

Although the present disclosure and its advantages have been described in detail, it should be understood that various changes, substitutions, and alterations can be made herein without departing from the spirit and scope of the disclosure as defined by the appended claims. For example, the controller and processing unit mentioned in the above embodiments may be a microcontroller, central processing unit (CPU), other hardware circuit elements capable of executing relevant instructions, or combination of computing circuits that shall be well-appreciated by those skilled in the art based on the above disclosures.

Moreover, the storage mentioned in the above embodiments may be memories, such as ROM, RAM, etc., for storing data. The I/O unit mentioned in the above embodiments may be a touch screen, a combination of display and I/O device (e.g., Human Input Device), etc.

Further, the transceivers mentioned in the above embodiments may be a combination of a network data transmitter and a network data receiver. The bus may use a communication interface for transferring data between controller, processing unit, storage, I/O unit, and transceiver. The bus may include an electrical bus interface, an optical bus interface, or even a wireless bus interface. However, such description is not intended to limit the hardware implementation embodiments of the present disclosure.

Furthermore, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system for processing data, comprising:
  a data acquisition device for acquiring raw data from an object under test, the data acquisition device comprising:
    a data interface being coupled to the object under test for receiving the raw data from the object under test; and
    a first network data transceiver being electrically coupled to the data interface; and
  a central device communicating with a plurality of user devices, comprising:
    a storage;
    a second network data transceiver for wirelessly receiving the raw data from the first network data transceiver of the data acquisition device;
    a first processing unit being electrically coupled to the storage and the second network data transceiver, and for:
      storing the raw data in the storage; and
      performing a web application with a web interface for providing application data based on the raw data, wherein the raw data is converted into the application data by performing a data calculation application, and each of the user devices is capable of utilizing the application data; and
    a third network data transceiver being electrically coupled to the first processing unit and for:
      transmitting the application data to a first user device of the user devices through a network according to a request from the first user device, wherein the application data is transmitted to the first user device and the first user device transfers the application data into a data object and displays the data object for a user to operate; and
      receiving an instruction and a device configuration from the first user device through the network, wherein the instruction received from the first user device is for instructing the first processing unit to set up the data calculation application in the central device, and the device configuration received from the first user device is for configuring the data acquisition device wirelessly communicated with the central device.

2. The system of claim 1, further comprising the first user device which communicates with the central device, and the first user device comprising:
  a fourth network data transceiver;
  a second processing unit being electrically coupled to the fourth network data transceiver and for:
    performing a browsing application for interacting with the web interface of the web application of the central device;
    requesting the application data from the central device, wherein the fourth network data transceiver receives the application data through the third network data transceiver of the central device; and
    performing the browsing application to process the application data into the data object; and
  an input/output unit being electrically coupled to the second processing unit and for receiving a control signal to perform an output operation on the data object according to the control signal.

3. The system of claim 2, wherein the input/output unit comprises a touch screen, the control signal comprises a gesture signal, and the output operation comprises displaying at least a portion of the data object on the touch screen.

4. The system of claim 2, wherein the second processing unit of the first user device transmits the instruction via the fourth network data transceiver to the third network data transceiver of the central device for instructing the first processing unit of the central device to set up the data calculation application.

5. The system of claim 2, wherein the application data comprise a plurality of data and a plurality of timestamps corresponding to the plurality of data respectively, and the data object is obtained based on at least a portion of the application data.

6. The system of claim 2, wherein the third network data transceiver and the fourth network data transceiver communicate with each other based on a protocol of Wi-Fi.

7. The system of claim 1, wherein the first processing unit further performs another data calculation application for calculating the raw data into another application data.

8. The system of claim 1, wherein the data acquisition device is free from having a storage for storing the raw data from the object under test, and the first network data transceiver transmits the raw data in real-time.

9. The system of claim 1, wherein the first processing unit of the central device is for performing the web application with the web interface for receiving the device configuration via the third network data transceiver, the device configuration is used for configuring at least one setting of the data acquisition device, and the data acquisition device further receives the device configuration from the central device through the first network data transceiver.

10. The system of claim 1, wherein the data acquisition device comprises a headstage device, the data interface of the data acquisition device comprises an analog-to-digital converter for converting an analog signal to the raw data, and the analog signal is obtained by probing a biological object through the headstage device.

11. The system of claim 1, wherein the first network data transceiver and the second network data transceiver communicate with each other based on a protocol of Bluetooth Low Energy.

12. The system of claim 1, wherein the data acquisition device further comprises: a controller being electrically coupled to the data interface and the first network data transceiver and for controlling the first network data transceiver to transmit the raw data.

13. The system of claim 12, wherein the first processing unit of the central device transmits a synchronization signal via the second network data transceiver, and the controller of the data acquisition device further receives the synchronization signal via the first network data transceiver, and synchronizing the data acquisition device to the central device according to the synchronization signal.

14. A central device for processing data, comprising:
 a storage;
 a first network data transceiver for wirelessly receiving raw data from a data acquisition device;
 a processing unit being electrically coupled to the storage and the first network data transceiver, and for:
  storing the raw data in the storage; and
  performing a web application with a web interface for providing application data based on the raw data, wherein the raw data is converted into the application data by performing a data calculation application, and each of a plurality of user devices, which communicate with the central device, is capable of utilizing the application data; and
 a second network data transceiver being electrically coupled to the processing unit and for:
  transmitting the application data to a first user device of the user devices through a network according to a request from the first user device, wherein the application data is transmitted to the first user device, and the first user device transfers the application data into a data object and displays the data object for a user to operate; and
  receiving an instruction and a device configuration from the first user device through the network, wherein the instruction received from the first user device is for instructing the processing unit to set up the data calculation application in the central device, and the device configuration received from the first user device is for configuring the data acquisition device wirelessly communicated with the central device.

15. The central device of claim 14, wherein the processing unit is further for performing another data calculation application for calculating the raw data into another application data.

16. The central device of claim 14, wherein the processing unit is for performing the web application with the web interface for receiving the device configuration via the second network data transceiver, and for configuring at least one setting of the data acquisition device via the first network data transceiver.

17. The central device of claim 16, wherein the processing unit of the central device is for transmitting a synchronization signal via the first network data transceiver to the data acquisition device.

18. The central device of claim 14, wherein the central device is free from having a display and free from having a control panel.

\* \* \* \* \*